(12) United States Patent
Nakanishi et al.

(10) Patent No.: US 11,474,047 B2
(45) Date of Patent: Oct. 18, 2022

(54) COMPUTER-READABLE RECORDING MEDIUM RECORDING IMAGE PROCESSING PROGRAM, IMAGE PROCESSING METHOD, AND IMAGE PROCESSING APPARATUS

(71) Applicant: FUJITSU LIMITED, Kawasaki (JP)

(72) Inventors: Yusuke Nakanishi, Kawasaki (JP); Hideyuki Kikuchi, Chigasaki (JP); Hiroshi Yamagami, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 202 days.

(21) Appl. No.: 16/897,971

(22) Filed: Jun. 10, 2020

(65) Prior Publication Data

US 2020/0300779 A1 Sep. 24, 2020

Related U.S. Application Data

(63) Continuation of application No. PCT/JP2017/046432, filed on Dec. 25, 2017.

(51) Int. Cl.
*G01N 21/88* (2006.01)
*G06T 7/00* (2017.01)

(52) U.S. Cl.
CPC ..... *G01N 21/8851* (2013.01); *G01N 21/8803* (2013.01); *G06T 7/0002* (2013.01);
(Continued)

(58) Field of Classification Search
CPC ... G01N 2203/0066; G01N 2203/0062; G01N 2203/0064; G01N 3/00; G01N 3/08; G01N 2203/0073; G01N 2203/0218; G01N 17/00; G01N 3/32; G01N 3/28; G01N 2203/0214; G01N 2203/0682; G01N 33/383; G01N 2203/0075; G01N 27/20; G01N 3/02; G01N 33/2045; G01N 2021/8848; G01N 21/23;
(Continued)

(56) References Cited

U.S. PATENT DOCUMENTS

| 4,947,447 A | 8/1990 | Miyaoka et al. |
| 8,756,085 B1 * | 6/2014 | Plummer ............... G06T 7/187 |
| | | 705/40 |

(Continued)

FOREIGN PATENT DOCUMENTS

| CN | 104685337 A | * | 6/2015 | .......... G01M 5/0033 |
| CN | 106840877 A | * | 6/2017 | .............. G01N 3/08 |

(Continued)

OTHER PUBLICATIONS

Japanese Office Action dated Mar. 2, 2021 for corresponding Japanese Patent Application No. 2019-561403, with English Translation, 7 pages.

(Continued)

*Primary Examiner* — Michael P Stafira
(74) *Attorney, Agent, or Firm* — Fujitsu Patent Center

(57) ABSTRACT

A non-transitory computer-readable recording medium recording an image processing program that causes a computer to execute processing of: specifying a damaged portion by analyzing a captured image of a construction; and predicting, in the captured image, a range to which damage spreads based on the specified damaged portion and design data associated with the construction.

4 Claims, 18 Drawing Sheets

(52) U.S. Cl.
CPC .................. *G01N 2021/888* (2013.01); *G01N 2021/8887* (2013.01)

(58) Field of Classification Search
CPC ........... G01N 21/8806; G01N 21/8851; G01N 21/95; G01N 2203/0017; G01N 2203/0048; G01N 2203/0216; G01N 2203/0226; G01N 2203/0676; G01N 2291/02827; G01N 25/72; G01N 27/041; G01N 29/041; G01N 29/045; G01N 29/14; G01N 29/4418; G01N 3/06; G01N 3/12; G01N 3/18; G01N 33/24; G01N 1/28; G01N 15/088; G01N 17/006; G01N 2021/646; G01N 2021/8874; G01N 2021/8887; G01N 21/1717; G01N 21/6456; G01N 2203/0003; G01N 2203/0005; G01N 2203/0025; G01N 2203/0067; G01N 2203/0071; G01N 2203/0212; G01N 2203/0232; G01N 2203/0252; G01N 2203/0282; G01N 2203/0641; G01N 2291/0235; G01N 2291/0258; G01N 2291/0422; G01N 2291/2693; G01N 3/04; G01N 3/24; G01N 1/32; G01N 15/08; G01N 15/082; G01N 2021/888; G01N 2033/0095; G01N 21/64; G01N 21/88; G01N 2203/0019; G01N 2203/006; G01N 2203/0244; G01N 2203/025; G01N 2203/027; G01N 2203/0664; G01N 2203/0694; G01N 2223/345; G01N 2291/267; G01N 27/221; G01N 27/24; G01N 27/82; G01N 27/83; G01N 27/84; G01N 29/043; G01N 29/245; G01N 29/44; G01N 29/4427; G01N 29/4463; G01N 3/068; G01N 33/00; G01N 33/20; G01N 33/204; G01N 33/386; G01N 33/442; G01B 11/16; G01B 21/045; G01B 21/32; G01B 7/003; G01B 7/18; E04G 23/00

See application file for complete search history.

(56) References Cited

U.S. PATENT DOCUMENTS

| | | | | |
|---|---|---|---|---|
| 9,159,132 B1 * | 10/2015 | Crowsey | ................ | G06T 7/262 |
| 9,488,592 B1 * | 11/2016 | Maresca | ................ | G01N 25/72 |
| 9,805,261 B1 * | 10/2017 | Loveland | ............... | G06V 20/20 |
| 2002/0146162 A1 * | 10/2002 | Ozaki | .................... | G01N 21/88 |
| | | | | 382/152 |
| 2014/0064554 A1 * | 3/2014 | Coulter | ............... | G06V 10/245 |
| | | | | 382/294 |
| 2014/0184786 A1 * | 7/2014 | Georgeson | ........... | G01M 99/00 |
| | | | | 348/128 |
| 2015/0213166 A1 * | 7/2015 | Mills | ....................... | G06F 30/23 |
| | | | | 703/2 |
| 2016/0133008 A1 * | 5/2016 | Kuratate | ................... | G06T 7/12 |
| | | | | 382/141 |
| 2018/0189750 A1 | 7/2018 | Nonaka et al. | | |
| 2018/0217024 A1 | 8/2018 | Takamori et al. | | |
| 2018/0292328 A1 | 10/2018 | Karube | | |

FOREIGN PATENT DOCUMENTS

| | | | | | |
|---|---|---|---|---|---|
| JP | S62-281582 | A | | 12/1987 | |
| JP | 2003-329594 | A | | 11/2003 | |
| JP | 3886865 | B2 | * | 2/2007 | .......... G01N 29/069 |
| JP | 2012-225811 | A | | 11/2012 | |
| JP | 2014-006222 | A | | 1/2014 | |
| JP | 5688533 | B1 | * | 3/2015 | ............. G01C 11/00 |
| JP | 5740509 | B1 | * | 6/2015 | |
| KR | 20110094619 | A | * | 8/2011 | |
| KR | 20170136605 | A | * | 12/2017 | |
| RU | 2445601 | C2 | * | 3/2012 | ......... G06F 17/5018 |
| WO | WO-2006126617 | A1 | * | 11/2006 | .......... G01N 23/046 |
| WO | 2017/047315 | A1 | | 3/2017 | |
| WO | 2017/051554 | A1 | | 3/2017 | |
| WO | WO-2017077668 | A1 | * | 5/2017 | ............... G01N 3/02 |
| WO | 2017/110278 | A1 | | 6/2017 | |
| WO | WO-2017110278 | A1 | * | 6/2017 | ............. G01N 21/88 |
| WO | WO-2017122641 | A1 | * | 7/2017 | ............. G01B 11/02 |
| WO | WO-2017187966 | A1 | * | 11/2017 | ............. G01B 11/02 |
| WO | 2017/217185 | A1 | | 12/2017 | |
| WO | WO-2017217185 | A1 | * | 12/2017 | ............. G01N 21/88 |

OTHER PUBLICATIONS

International Search Report and Written Opinion of the International Searching Authority (Form PCT/ISA/210, 220, and 237), mailed in connection with PCT/JP2017/046432 and dated Feb. 13, 2018 (14 pages).

European Search Report dated Oct. 28, 2020 for corresponding European Patent Application No. 17936252.0, 13 pages.

Wu, Xiaoyang et al., "A New Method of Subway Tunnel Crack Image Compression Based on ROI and Motion Estimation", 2014 Tenth International Conference on Intelligent Information Hiding and Multimedia Signal Processing, IEEE, Aug. 27, 2014, XP32715187, pp. 928-931.

Extended European Search Report dated Feb. 24, 2021 for corresponding European Patent Application No. 17936252.0, 14 pages.

* cited by examiner

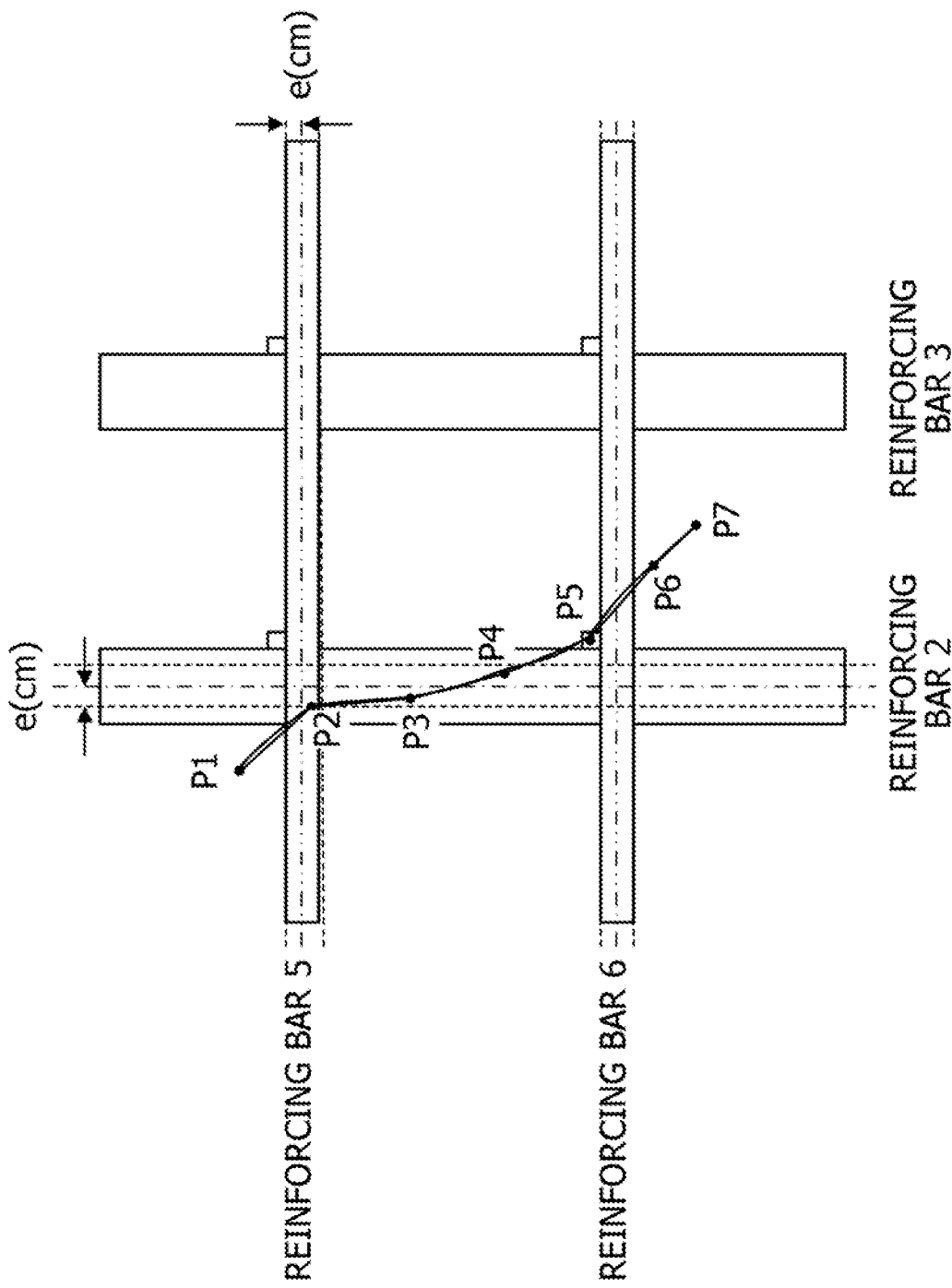

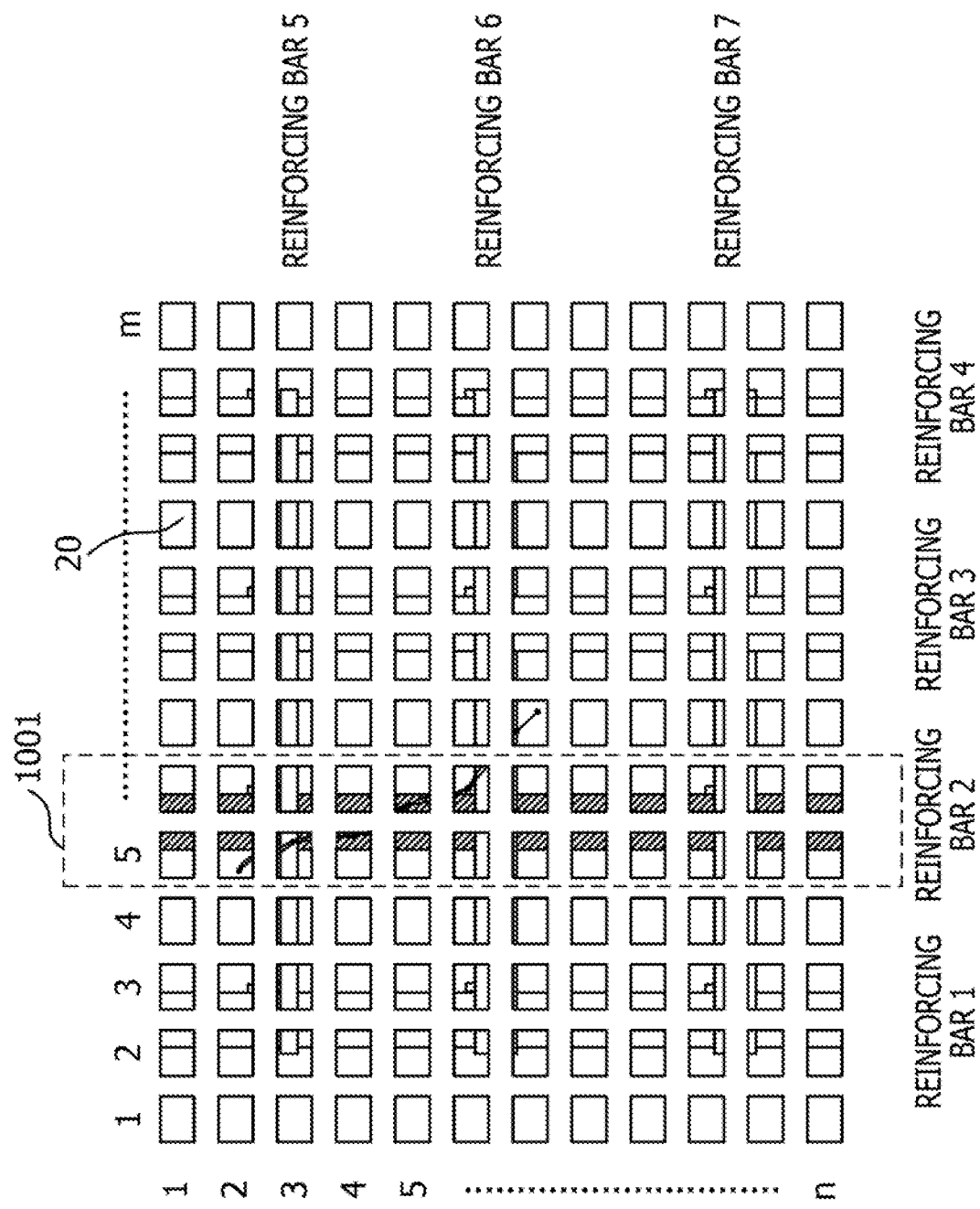

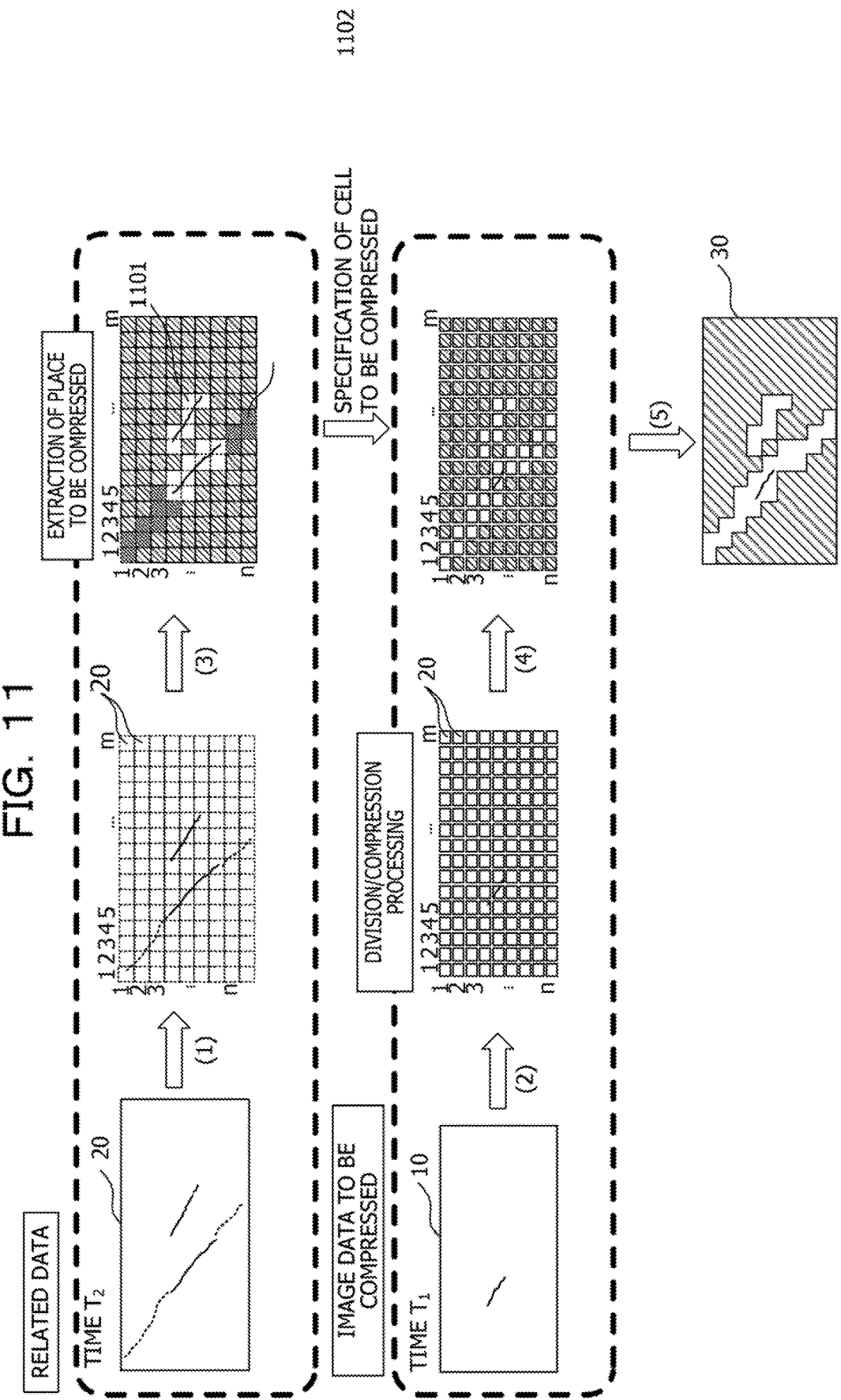

FIG. 12

| IDENTIFICATION NUMBER | POSITION INFORMATION | TIME INFORMATION | IMAGE DATA |
|---|---|---|---|
| 10a | IMAGE CAPTURING POSITION OF IMAGE DATA WITH IDENTIFICATION NUMBER "10a" | TIME INFIMAGE CAPTURING TIME OF IMAGE DATA WITH IDENTIFICATION NUMBER "10a"ORMATION | IMAGE DATA OF IDENTIFICATION NUMBER "10a" |
| 10b | IMAGE CAPTURING POSITION OF IMAGE DATA WITH IDENTIFICATION NUMBER "10b" | TIME INFIMAGE CAPTURING TIME OF IMAGE DATA WITH IDENTIFICATION NUMBER "10b"ORMATION | IMAGE DATA OF IDENTIFICATION NUMBER "10b" |
| 10c | IMAGE CAPTURING POSITION OF IMAGE DATA WITH IDENTIFICATION NUMBER "10c" | TIME INFIMAGE CAPTURING TIME OF IMAGE DATA WITH IDENTIFICATION NUMBER "10c"ORMATION | IMAGE DATA OF IDENTIFICATION NUMBER "10c" |
| 10d | IMAGE CAPTURING POSITION OF IMAGE DATA WITH IDENTIFICATION NUMBER "10d" | TIME INFIMAGE CAPTURING TIME OF IMAGE DATA WITH IDENTIFICATION NUMBER "10d"ORMATION | IMAGE DATA OF IDENTIFICATION NUMBER "10d" |
| ... | ... | ... | ... |

| MEMBER IDENTIFICATION INFORMATION | STRUCTURE INFORMATION | ... |
|---|---|---|
| ... | ... | ... |
| **** | **** | **** |
| **** | **** | **** |
| ... | ... | ... |

| IDENTIFICATION NUMBER | POSITION INFORMATION | TIME INFORMATION | IMAGE DATA | VECTOR DATA |
|---|---|---|---|---|
| 10a | IMAGE CAPTURING POSITION OF IMAGE DATA WITH IDENTIFICATION NUMBER "10a" | TIME INFIMAGE CAPTURING TIME OF IMAGE DATA WITH IDENTIFICATION NUMBER "10a"ORMATION | IMAGE DATA OF IDENTIFICATION NUMBER "10a" | - |
| 10b | IMAGE CAPTURING POSITION OF IMAGE DATA WITH IDENTIFICATION NUMBER "10b" | TIME INFIMAGE CAPTURING TIME OF IMAGE DATA WITH IDENTIFICATION NUMBER "10b"ORMATION | IMAGE DATA OF IDENTIFICATION NUMBER "10b" | VECTOR DATA CORRESPONDING TO IMAGE DATA WITH IDENTIFICATION NUMBER "10b" (DAMAGED PART INFORMATION) |
| 10c | IMAGE CAPTURING POSITION OF IMAGE DATA WITH IDENTIFICATION NUMBER "10c" | TIME INFIMAGE CAPTURING TIME OF IMAGE DATA WITH IDENTIFICATION NUMBER "10c"ORMATION | IMAGE DATA OF IDENTIFICATION NUMBER "10c" | - |
| 10d | IMAGE CAPTURING POSITION OF IMAGE DATA WITH IDENTIFICATION NUMBER "10d" | TIME INFIMAGE CAPTURING TIME OF IMAGE DATA WITH IDENTIFICATION NUMBER "10d"ORMATION | IMAGE DATA OF IDENTIFICATION NUMBER "10d" | VECTOR DATA CORRESPONDING TO IMAGE DATA WITH IDENTIFICATION NUMBER "10d" (DAMAGED PART INFORMATION) |
| ... | ... | ... | ... | ... |

| IMAGE DATA IDENTIFICATION INFORMATION : ******* ||
|---|---|
| ADDRESS INFORMATION | COMPRESSION INFORMATION |
| (1,1) | True |
| (1,2) | True |
| (1,3) | True |
| ... | ... |
| (5,5) | False |
| (5,6) | False |
| (5,7) | False |
| ... | ... |

1600

COMPUTER-READABLE RECORDING MEDIUM RECORDING IMAGE PROCESSING PROGRAM, IMAGE PROCESSING METHOD, AND IMAGE PROCESSING APPARATUS

CROSS-REFERENCE TO RELATED APPLICATION

This application is a continuation application of International Application PCT/JP2017/046432 filed on Dec. 25, 2017 and designated the U.S., the entire contents of which are incorporated herein by reference.

FIELD

The embodiment relates to an image processing program, an image processing method, and an image processing apparatus.

BACKGROUND

An infrastructure such as a construction is maintained and managed by inspecting the infrastructure and performing work such as repair when an abnormality is detected. In the field of maintenance and management of the infrastructure as described above, there are problems such as insufficient staffing and costs. For this reason, various attempts have been made to improve efficiency of the maintenance and management using information and communication technology (ICT) technology, for example.

Related art is disclosed in Japanese Laid-open Patent Publication No. 2003-329594, Japanese Laid-open Patent Publication No. 2012-225811 and Japanese Laid-open Patent Publication No. 62-281582.

SUMMARY

According to an aspect of the embodiments, a non-transitory computer-readable recording medium recording an image processing program that causes a computer to execute processing of: specifying a damaged portion by analyzing a captured image of a construction; and predicting, in the captured image, a range to which damage spreads based on the specified damaged portion and design data associated with the construction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram for describing a distance relationship between the line segments and members.

FIG. 10 is a diagram illustrating prediction of a cell to which the damage may spread.

FIG. 11 is a diagram illustrating an example of the image compression processing according to the embodiment.

FIG. 12 is a diagram illustrating an example of image data information according to the embodiment.

FIG. 13 is a diagram illustrating an example of design data information according to the embodiment.

FIG. 15 is a diagram illustrating damaged portion data according to the embodiment.

FIG. 16 is a diagram illustrating prediction information for image data identified by certain identification information according to the embodiment.

DESCRIPTION OF EMBODIMENTS

Figure 1:
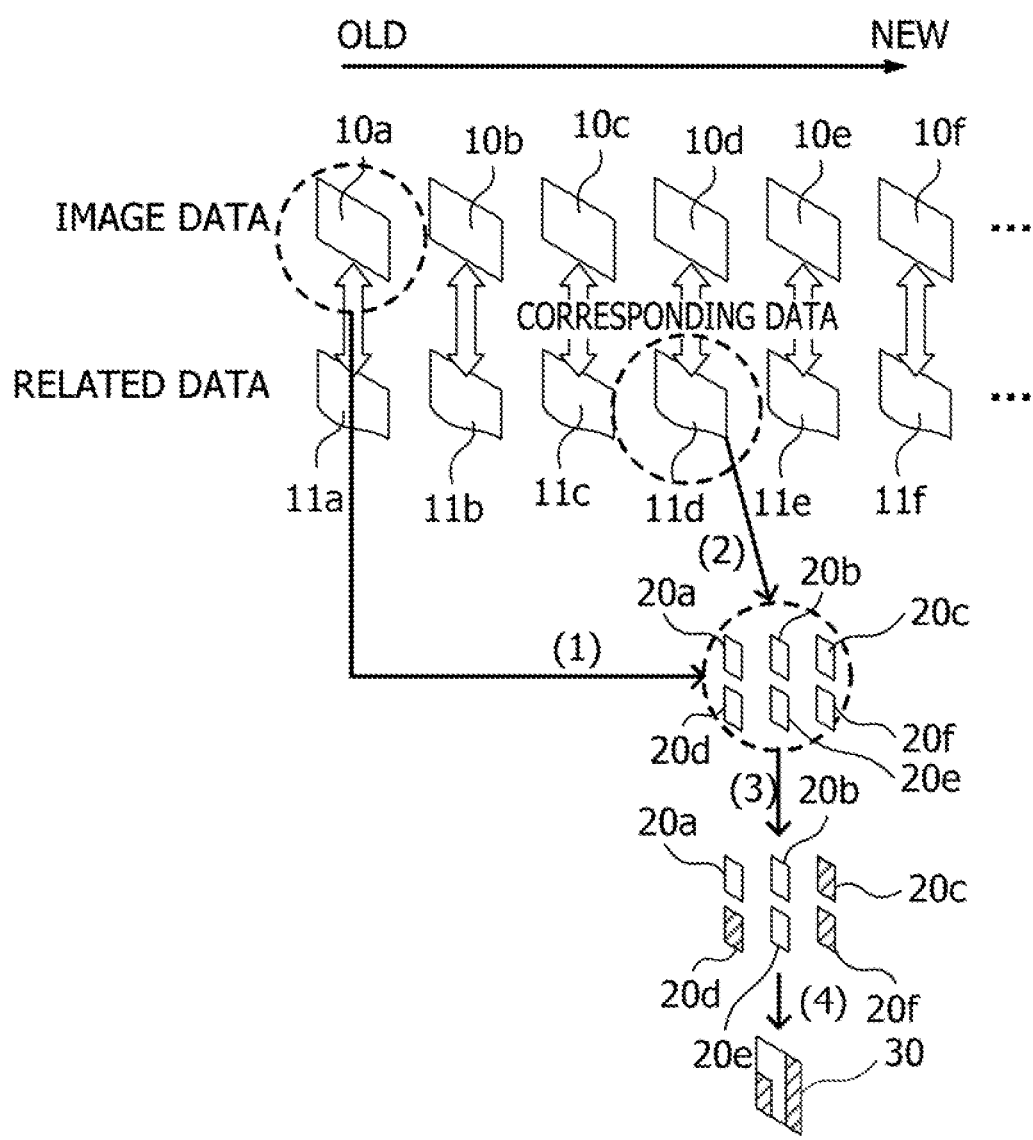
FIG. 1 is a diagram for describing exemplary image compression processing.

Examples of a technology that uses the ICT technology include a technology that captures an image of a construction using an image capturing device, a drone, a robot, or the like, and uses the image obtained by the image capturing (captured image) to improve efficiency and accuracy of the inspection. For example, by storing, in a database, image data captured with a measuring vehicle or a sensor, and analyzing the image data stored in the database, anomaly detection and prediction of aging are performed to improve the efficiency of inspection work and the like for a construction. Note that, in order to accurately detect an abnormality in a construction using image data, it is preferable to use high-resolution image data.

However, when image data are captured and stored for inspection, a data amount of the image data may increase and a storage region may be pressed.

In one aspect, image data may be efficiently saved.

Hereinafter, several embodiments of the present invention will be described in detail with reference to the drawings. Note that corresponding elements in a plurality of drawings are denoted with the same reference numeral.

FIG. 1 is a diagram for describing exemplary image compression processing. For example, image data 10 (for example, image data 10a to 10f) may be generated by capturing an image of a construction to be inspected with an image capturing device such as a camera. The image data 10 may be raster image data, in an example. The image data 10 may be captured, for example, in an order of the image data 10a, 10b, 10c, 10d, 10e, and 10f. Note that the construction to be inspected may be a construction to be repaired or the like, in which an abnormality, aging deterioration, and the like are monitored, such as a pavement surface of a road, a bridge, or a tunnel, for example.

Furthermore, related data 11a to 11f are data corresponding to the image data 10a to 10f, respectively. Related data 11 may be, for example, vector image data indicating the shape of damage included in a construction, such as a crack or a fissure detected from the corresponding image data 10.

The image data 10a to 10f may be images obtained by capturing the same place at different times. For example, the image data 10a of a certain place at a certain time may be captured, and the related data 11a may be generated from the image data 10a. Several years later, the image data 10b of the same place may be captured, and the related data 11b may be generated from the image data 10b.

For example, an image processing apparatus may detect the shape of damage included in a construction such as a crack or a fissure by duplicating and analyzing the image data 10a to 10f, and generate the related data 11a to 11f. For example, the image processing apparatus may generate, as a vector image, position information of a damaged part acquired by a device such as a physical quantity sensor. If the damage is a crack, a line of the crack may be a vector image.

Subsequently, exemplary data amount reduction processing on the image data 10 will be described. For example, it is assumed that an image capturing time of the image data 10a is $T_1$ and an image capturing time of the image data 10d is $T_2$. Here, the image capturing time $T_1$ is a time before the image capturing time $T_2$.

First, the image processing apparatus divides the image data 10a into a plurality of regions to generate a plurality of cells 20a to 20f ((1) in FIG. 1).

The image processing apparatus compares the image data 10a captured at the time $T_1$ with the related data 11d generated from the image data 10d captured at the time $T_2$, and specifies a cell 20 including damage ((2) in FIG. 1). The cell 20 including the damage is, for example, a cell 20 including a damaged portion whose shape is defined by the related data 11d. Subsequently, the image processing apparatus specifies a cell 20 not including the damaged portion among the cells 20a to 20f, and compresses the specified cell 20 ((3) in FIG. 1). For example, the image processing apparatus compresses the cells 20c, 20d, and 20f.

The image processing apparatus generates compressed image data corresponding to the original image data 10a by combining the compressed cells 20c, 20d, and 20f with the uncompressed cells 20a, 20b, and 20e ((4) in FIG. 1). The image processing apparatus saves the compressed image data 30 in a database instead of the image data 10a before the compression. Therefore, it is possible to reduce a data amount of the image data while reducing deterioration of the data in a region including the damage at a point of the time $T_2$ in the image data.

Figure 2:
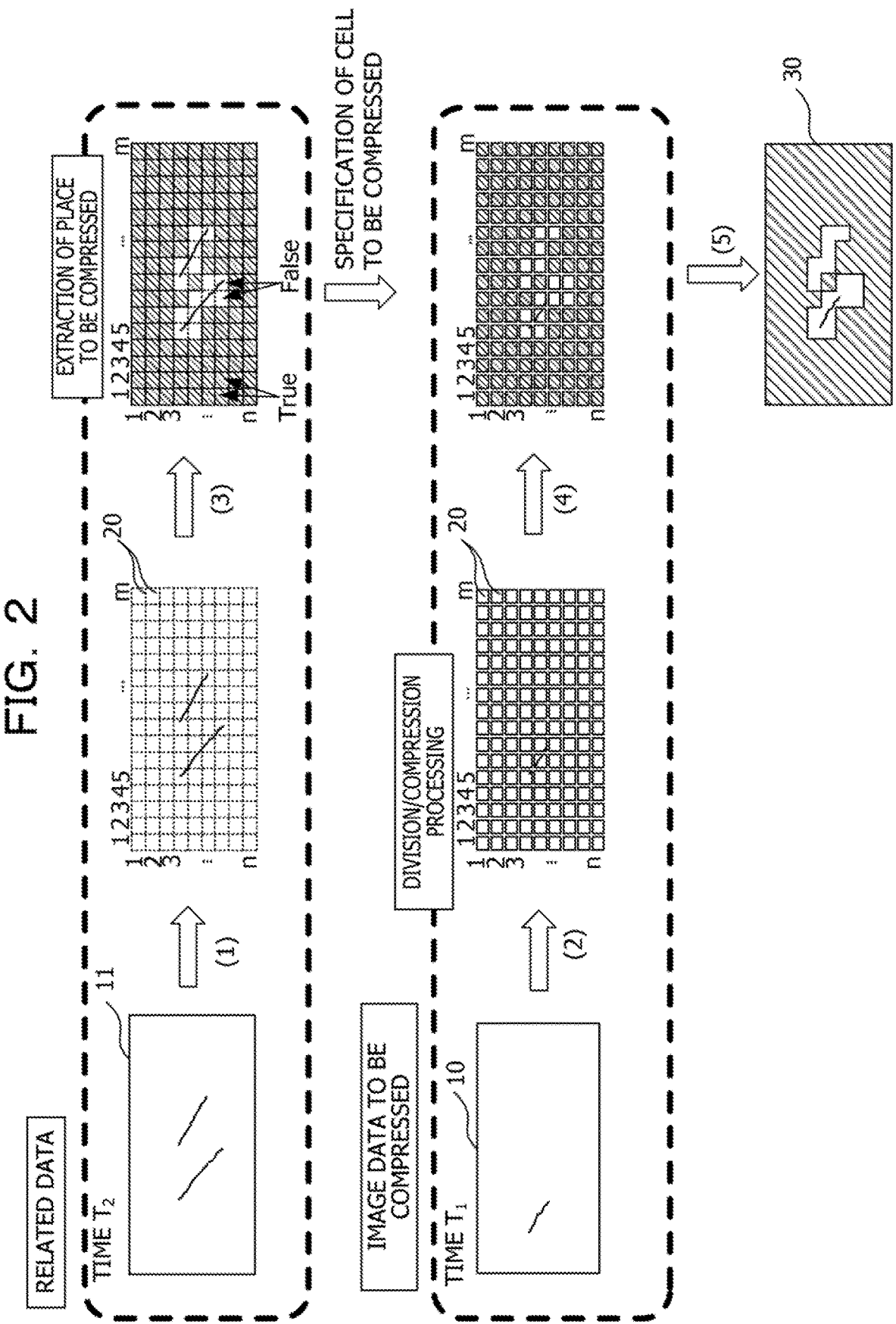
FIG. 2 is another diagram for describing the exemplary image compression processing.

FIG. 2 is a diagram for further describing the exemplary image compression processing described above. An upper part illustrates processing of specifying a compression part using the related data 11 obtained from the image data captured at the time $T_2$. Furthermore, a lower part illustrates compression processing of the image data 10 captured at the time $T_1$. Note that, in an embodiment, the time $T_2$ may be a time after the time $T_1$. As illustrated in FIG. 2, for example, when the image data 10 at the time $T_1$ is to be compressed, the image processing apparatus acquires the related data 11 at the time $T_2$, which is captured after the time $T_1$. Then, the image processing apparatus divides the acquired related data 11 into a plurality of cells 20 ((1) in FIG. 2). For example, the image processing apparatus may divide the related data 11 into the cells 20 in a predetermined number such as m×n, and assign, to each of the cells 20 obtained by the division, address information indicating an arrangement in the related data. Furthermore, as illustrated in the lower part of FIG. 2, the image processing apparatus acquires the image data 10 to be compressed at the time $T_1$, and divides the acquired image data 10 into a plurality of cells 20 ((2) in FIG. 2). For example, the image processing apparatus may divide the image data 10 into the cells 20 in a predetermined number such as m×n, and assign, to each of the cells 20 obtained by the division, address information indicating an arrangement in the image data.

An image processing apparatus 400 specifies, among the cells 20 obtained by the division, a cell 20 arranged in the region including the damage indicated in the related data 11 at the time $T_1$. Then, the image processing apparatus 400 sets "False" indicating that the cell is not to be compressed to a cell 20 including the damage, and sets "True" indicating that the cell is to be compressed to a cell 20 not including the damage ((3) in FIG. 2). Then, the image processing apparatus 400 compresses, among the plurality of cells 20 obtained by dividing the image data 10 captured at the time $T_1$, data of the cell to be compressed, which is arranged at a position where "True" is set ((4) in FIG. 2).

Subsequently, the image processing apparatus 400 combines the uncompressed cells 20 at positions set to "False" with the compressed cells 20 at the positions set to "True", and generates the compressed image data 30 corresponding to the original image data 10 ((5) in FIG. 2). Therefore, for example, it is possible to generate the image data 30 that is an image having a sufficient quality as an image used for the inspection or the like for the regions of the cells 20 including the damage at the point of the time $T_2$, while the data of regions of other cells 20 is compressed. Therefore, it is possible to reduce a data capacity of the image data while reducing a decrease in detection accuracy of an abnormality in a construction. However, damage such as a crack may spread to the compressed image region.

Figure 3A:
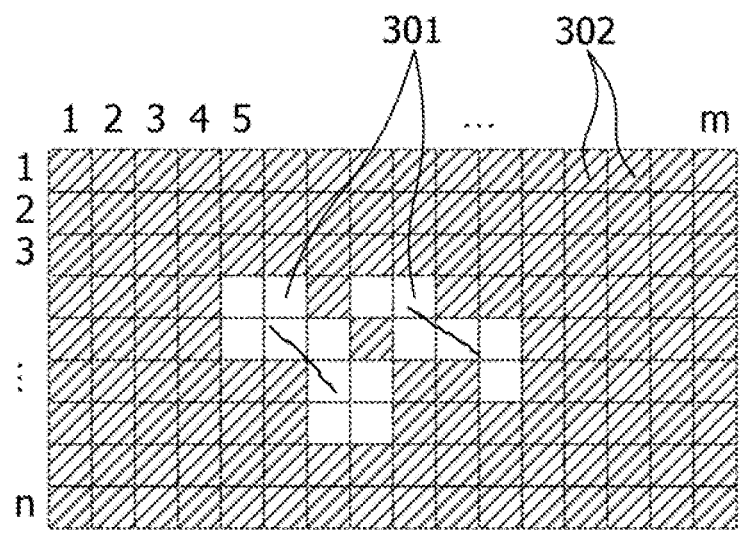
FIGS. 3A to 3C are diagrams for describing an example in which damage spreads to a region of a compressed cell in image data.
Figure 3B:
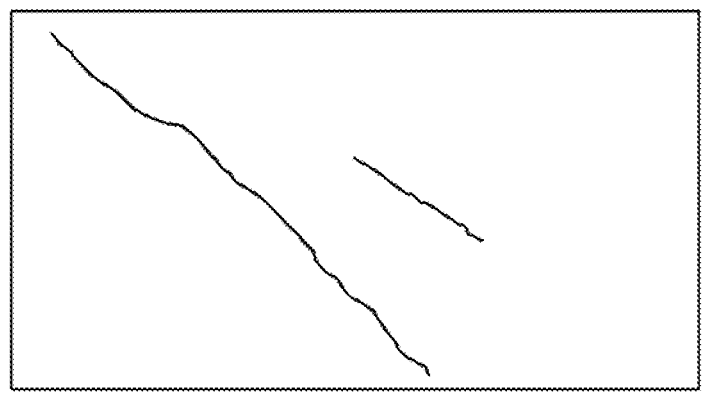
Figure 3C:
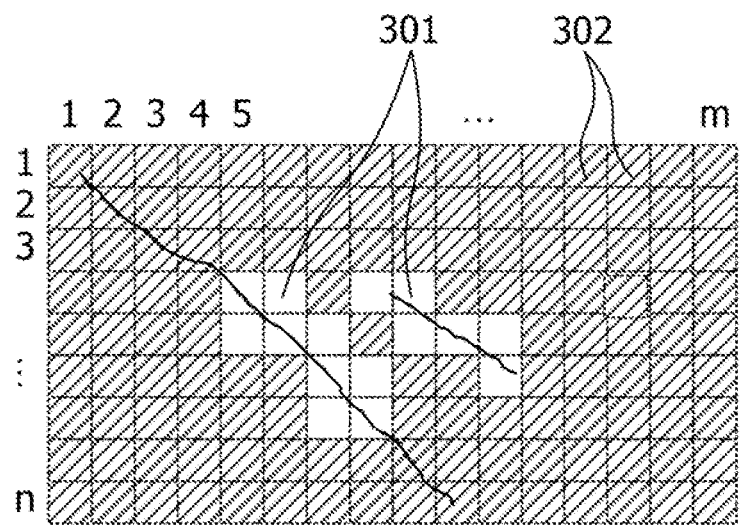

FIGS. 3A to 3C are diagrams for describing an example in which the damage spreads to the region of the compressed cell 20 in the image data 10. For example, FIG. 3A is a diagram illustrating the compressed image data 30 obtained by compressing the image data 10 captured at a certain time. At this point, the damage is included in uncompressed regions 301, and the damage is not included in compressed regions 302. However, the damage may spread beyond the uncompressed regions 301. FIG. 3B is a diagram illustrating a state in which the damage spreads at a time after the time when the image data of FIG. 3A is captured, and FIG. 3C is a diagram illustrating superposition of FIG. 3A and FIG. 3B. As illustrated in FIG. 3C, the damage is also included in the regions 302 of the compressed cells. Since the region deteriorated by the compression includes the damage, a problem may occur when an abnormality or aging is detected using these images.

Therefore, in the embodiment described below, the image processing apparatus predicts a region to which the damage is likely to spread. Therefore, according to the embodiment, the region to which the damage is likely to spread can be kept uncompressed, and it is possible to efficiently save the image data by reducing the data amount of the image data while reducing the deterioration of the data in the region to which the damage of the image data is likely to spread. Hereinafter, the embodiment will be described.

Figure 4:
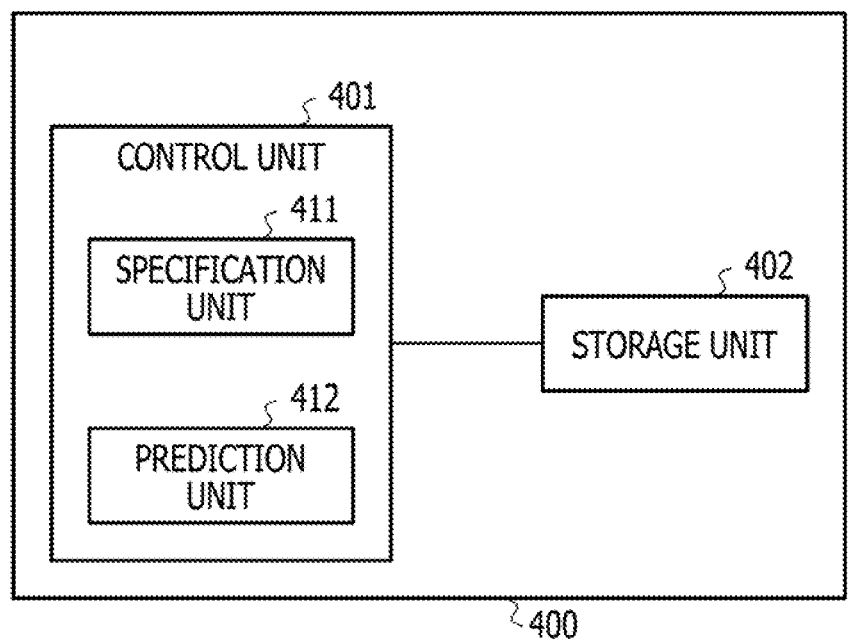
FIG. 4 is a diagram illustrating a block configuration of an image processing apparatus according to an embodiment.

FIG. 4 is a diagram illustrating a block configuration of the image processing apparatus 400 according to the embodiment. The Image processing apparatus 400 includes, for example, a control unit 401 and a storage unit 402. The control unit 401 includes, for example, a specification unit 411 and a prediction unit 412. For example, the storage unit 402 of the image processing apparatus 400 stores information such as image data information 1200, design data information 1300, damaged portion data 1500, and prediction information 1600, which will be described later. Details of these units and details of the information stored in the storage unit 402 will be described later.

As described above, in the embodiment, the control unit 401 of the image processing apparatus 400 predicts the region to which the damaged portion may spread. Hereinafter, the prediction of the region to which the damaged portion may spread will be described.

For example, it is assumed that damage such as a crack or a fissure has occurred in a member to be inspected for damage or aging, such as concrete, in a construction to be monitored for aging deterioration and the like and repaired or the like, such as a pavement surface of a road, a bridge, or a tunnel. In this case, rainwater or the like may enter the inside of the construction from the damage. Then, if the damage is along the member, for example, water that has entered the inside of the construction from the damage may come into contact with the member, which may cause the member to corrode or deteriorate with water to change its shape, and cause the damage to progress in a direction along the member. Note that the member may be made of, for example, a material such as a reinforcing bar or a steel frame, which is susceptible to deterioration or corrosion when exposed to water or wind and rain, and whose shape can be changed by the corrosion.

Figure 5:
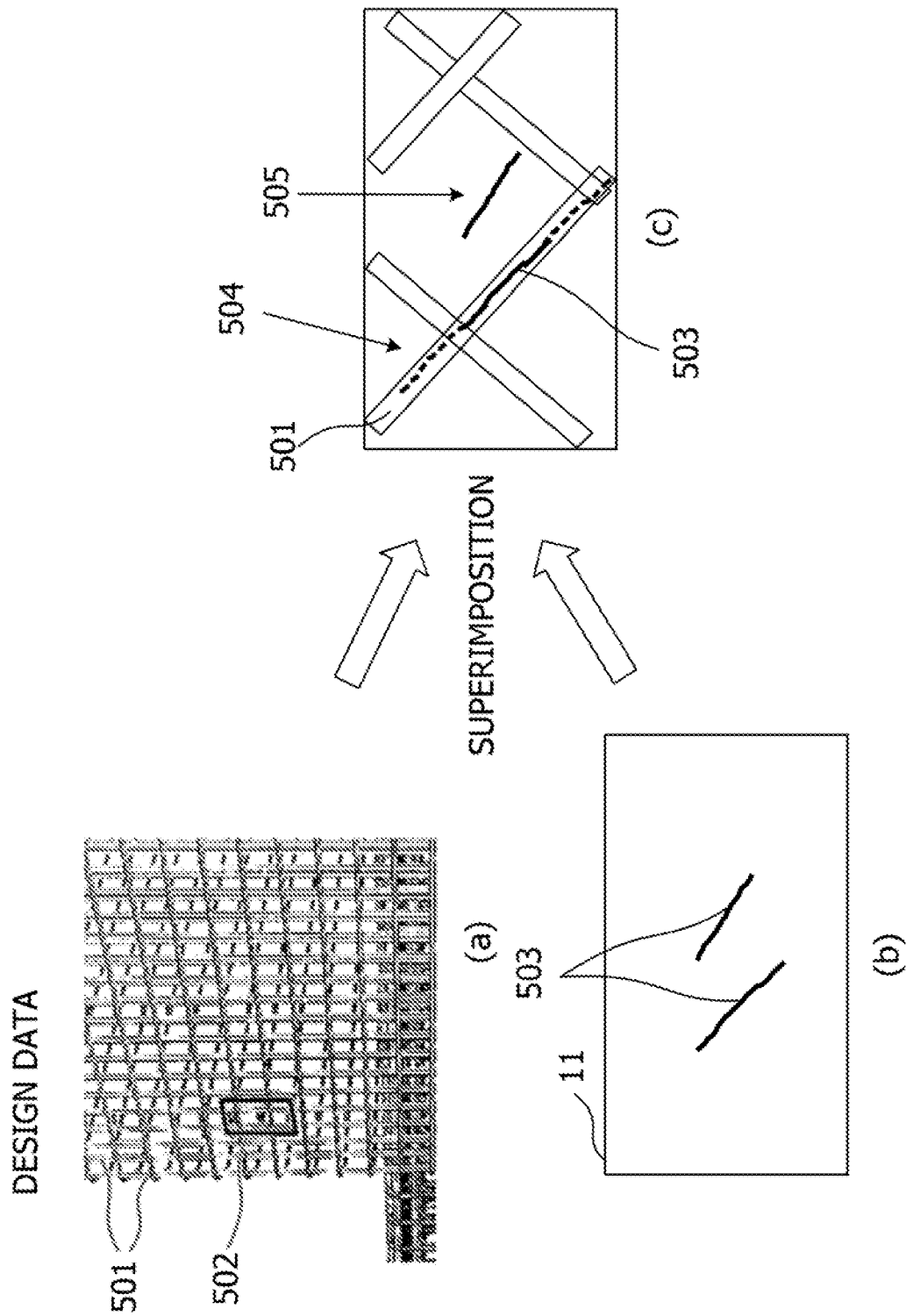
FIG. 5 is a diagram for describing an exemplary damage progression.

FIG. 5 is a diagram illustrating an exemplary damage progression. FIG. 5(a) is a diagram illustrating a three-dimensional model obtained from design data of a construction, and illustrates a structure of a member 501 such as a reinforcing bar or a steel frame. Here, damage 503 has occurred in a member to be inspected in a region indicated by a frame 502, and the related data 11 indicating the damage is illustrated in FIG. 5(b). In this case, when the structure of the member 501 is superimposed and displayed on the related data 11 of FIG. 5(b), the result is as illustrated in FIG. 5(c). Furthermore, in FIG. 5(c), a degree of overlap between a part of the damage 503 indicated in the related data 11 and the internal member 501 is high, and the extending directions of the part of the damage 503 and the member 501 coincide. In this case, the damage 503 is likely to progress in the direction along the member, as indicated by a dotted line indicated by an arrow 504. Therefore, by referring to the design data of the construction, the image processing apparatus 400 can predict that the damage will progress in the direction along the structure of the member as illustrated in FIG. 5(c). On the other hand, the other part of the damage 503, which is indicated by an arrow 505, has a low degree of overlap with the member 501 and a direction in which the other part of the damage 503 extends does not coincide with a direction in which the member 501 extends. Therefore, it may be estimated that a progression of the other part of the damage 503 is not affected by the member.

Hereinafter, the prediction of the damage progression will be described in more detail. First, the control unit 401 may represent, by line segments each having a predetermined length, a line segment of the damage indicated in the related data 11.

Figure 6:
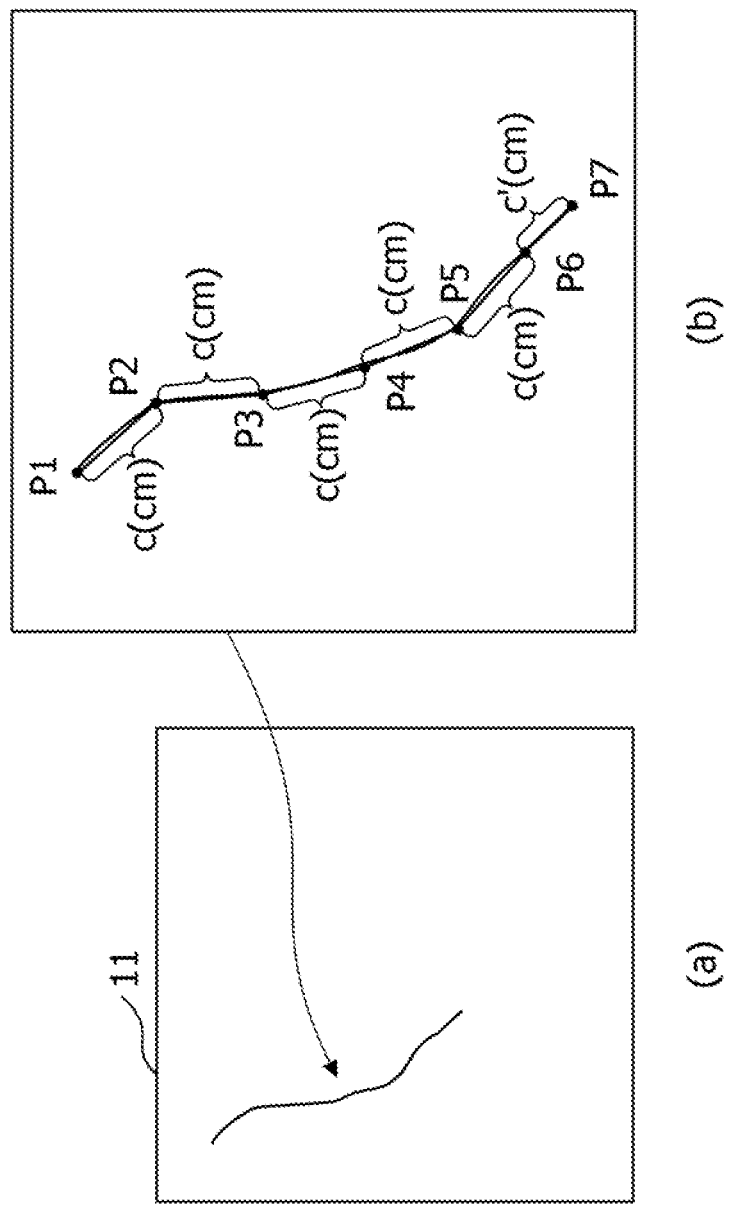
FIG. 6 is a diagram illustrating line segments representing the damage according to the embodiment.

FIG. 6 is a diagram illustrating an example in which the damage according to the embodiment is represented by line segments each having a predetermined length. For example, the control unit 401 of the image processing apparatus 400 divides the damage of the related data 11 into line segments of a predetermined length: c (cm), and assigns predetermined two-dimensional orthogonal coordinates to a start point and an end point of each line segment. Note that the predetermined length: c (cm) may be, for example, a length in the range of 5 cm to 10 cm. The control unit 401 may specify, as the end point, a point on each line segment of the damage at a predetermined distance from the start point. Furthermore, the specified end point may be used as the start point of the next line segment. In addition, the control unit 401 may assign identification information from P1 to Pn to the start point of each line segment. Furthermore, for example, a position of the first start point may be optionally selected. FIG. 6(b) is a diagram illustrating the line segments obtained by the division as described above, and the damage can be represented by the line segments of a predetermined length. Note that, if a distance to the end point of the damage is less than c (cm) when the damage is divided, the control unit 401 may assign coordinates to the end point of the line segment of the damage, at a distance of c' (cm) shorter than c (cm).

Subsequently, the control unit 401 acquires a three-dimensional model of the member forming the construction from the design data that is a design drawing of the construction, and determines a degree of overlap between the member 501 and a damaged portion.

Figure 7:
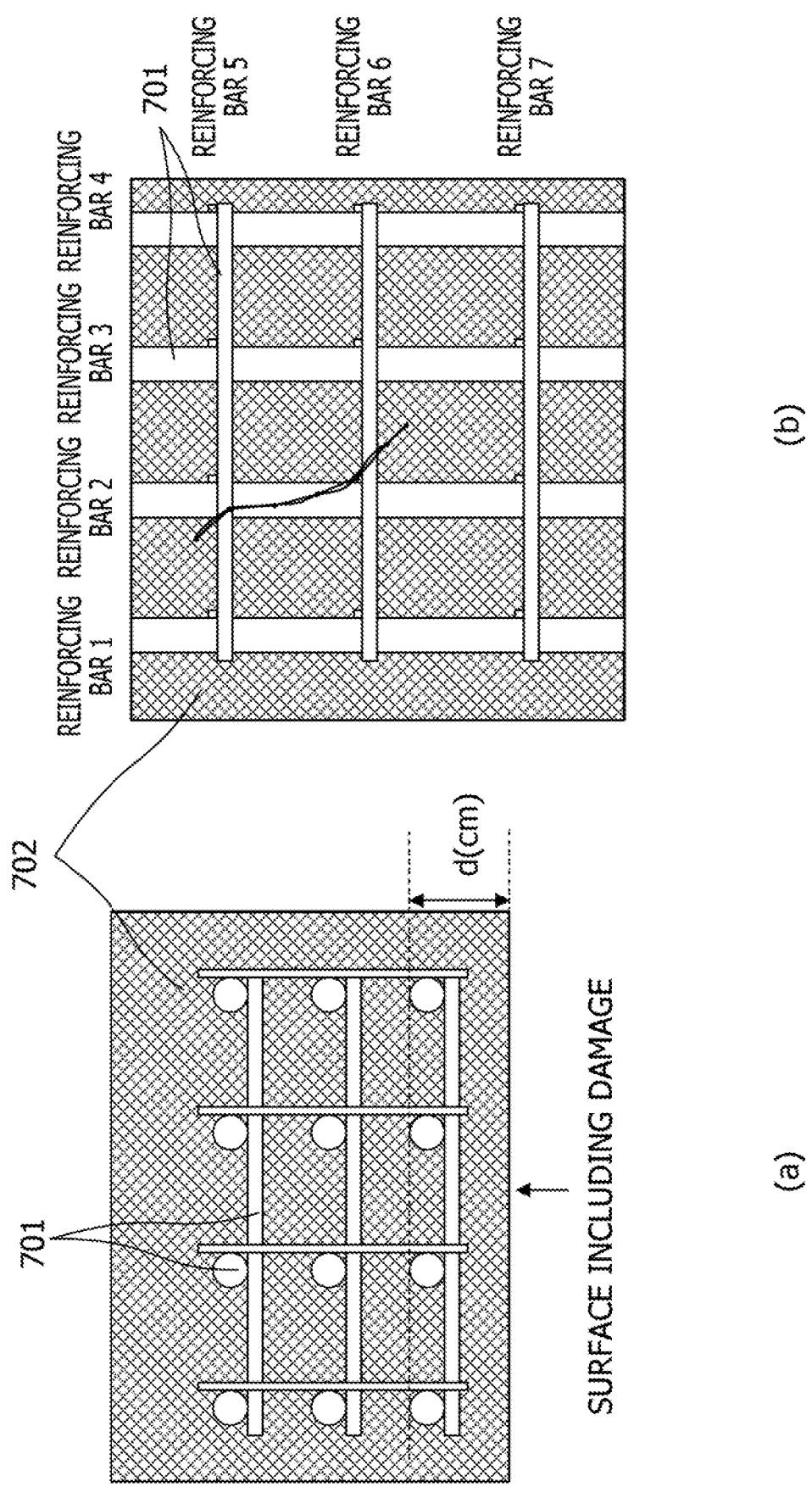
FIG. 7 is a diagram illustrating a three-dimensional model of a construction.

FIG. 7 is a diagram illustrating the three-dimensional model of the construction. FIG. 7(a) is a cross-sectional view of a member to be inspected in which members 701 and concrete 702 as an example of the member to be inspected for damage or the like are illustrated. Note that, in FIG. 7(a), it is assumed that a side surface of the concrete 702 on a lower part of the drawing is damaged. FIG. 7(b) is a diagram displaying, in a manner superimposed on the vector image, members visible at a depth within a predetermined distance d (cm) from the surface of the concrete 702 when the side surface of the concrete 702 including the damage is seen through from an image capturing direction of the image data 10 on which a vector image of the damage is based. By superimposing and displaying in this manner, as illustrated in FIG. 7(b), it is possible to evaluate a degree of overlap between the damaged portion and the members. Hereinafter, an example will be described in which the degree of overlap between the damaged portion and the members is evaluated by the distance.

For example, the control unit 401 extracts a combination of a line segment and a member in which a distance between the line segment and the member is less than a predetermined distance: e (cm), among line segments representing the damaged portion on a plane of the vector image. Note that, in an example, a distance between a start point and an end point of the line segment and a centerline in a longitudinal direction of the member may be used as the distance between the line segment and the member. Furthermore, in another example, the shortest distance between the line segment and the centerline in the longitudinal direction of the member may be used as the distance between the line segment and the member. The predetermined distance: e (cm) may be set to, for example, a distance at which it is estimated that water that has entered from the damage may affect deterioration of the members, from an average width or the like of the members included in the design data information 1300.

FIG. 8 is a diagram illustrating distances between the line segments and the members. In the example illustrated in FIG. 8, since a line segment P2-P3 and a line segment P3-P4 satisfy a condition for a reinforcing bar 2, the control unit 401 may extract the line segment P2-P3 and the line segment P3-P4 for the reinforcing bar 2.

Subsequently, the control unit 401 determines whether a direction in which the damaged portion extends and a direction in which a member extends coincide within a predetermined angle range. For example, the control unit 401 may determine whether an acute angle formed by a line segment extracted on the plane of the vector image and a centerline of a member is equal to or smaller than a predetermined angle: f (degree).

Figure 9A:
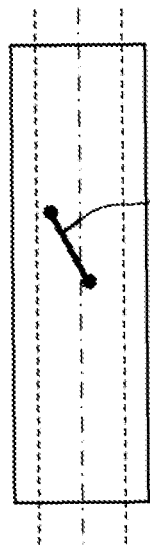
FIGS. 9A and 9B are diagrams for describing an angle between a line segment and a centerline of a member.
Figure 9B:
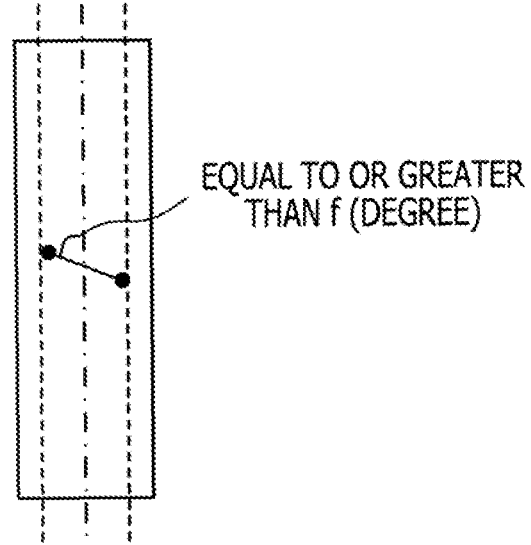

FIGS. 9A and 9B are diagrams illustrating an example of the determination of the angle between the extracted line segment and the centerline of the member. FIG. 9A illustrates, for example, an example of a case where a direction in which the extracted line segment extends and a direction in which the centerline of the member extends coincide to some extent, and the acute angle formed by the extracted line segment and the centerline of the member is equal to or smaller than f (degree). On the other hand, FIG. 9B illustrates, for example, an example of a case where the extracted line segment and the centerline of the member extend in greatly different directions, and the acute angle formed by the extracted line segment and the centerline of the member is greater than f (degree). As described above, when water or the like enters the inside from the damage that has occurred, comes into contact with the member, and causes the member to corrode or deteriorate, so that the shape of the member is changed, the damage may progress in a direction along the member along with the shape change. This is more likely to occur when, for example, the direction in which the member extends and the direction in which the damage extends are close to each other. Therefore, for example, as illustrated in FIG. 9A, when the acute angle formed by the direction in which the member extends and the direction in which the damage extends is equal to or smaller than f degrees, and the member and the damage extend in directions close to each other, the damage can be predicted to progress in the direction in which the member extends. On the other hand, for example, as illustrated in FIG. 9B, when the acute angle formed by the direction of the member and the direction of the damage is greater than f degrees, it can be estimated that the member does not significantly affect the spread of the damage. Therefore, the progression of the damage may be estimated to be unaffected by the member. Note that the predetermined angle may be, for example, less than 90 degrees, and may be, for example, 45 degrees. The predetermined angle may be, for example, set to an angle at which the damage is estimated to spread along the member, if the direction in which the damage extends coincides with the direction in which the member extends within this angle. Then, based on the line segment extracted as described above, it can be predicted that the damage may progress along the direction in which the member extends in the future.

Subsequently, for example, the control unit 401 may divide the image data to be compressed into m×n cell regions, and assign address information to each cell 20. Then, the control unit 401 specifies, as a cell to which the damage may spread in the future, a cell 20 including the reinforcing bar 2 whose degree of overlap with the line segment is high and extending direction coincides with the line segment within the predetermined angle range. The control unit 401 may register address information of the specified cell in the prediction information 1600 described later and store the address information in the storage unit 402.

FIG. 10 is a diagram illustrating the prediction of a cell 20 to which the damage may spread. In FIG. 10, cells 20 surrounded by a dotted frame 1001 are cells 20 including the reinforcing bar 2, and it is predicted that the damage may spread to the cells 20.

Note that one image data may be associated with one concrete floor slab, in an example. This is because, for example, if damage such as a fissure occurs in a part of the floor slab, the damage may spread to an edge of the floor slab. Therefore, the damage prediction may be performed, for example, on a floor slab basis. For example, if there is a member under the damage and the damage is predicted to extend along the member, the control unit 401 may specify, as the cells 20 to which the damage may spread, cells 20 including the member to an edge of the image data corresponding to the edge of the floorboard. Furthermore, in another embodiment, for example, when a member in which corrosion or deterioration progresses extends under another floor slab, the damage may spread to the another floor slab due to an influence of the corrosion or the deterioration of the member. Therefore, in the another embodiment, for example, the progression of the damage up to a predetermined number of years later may be predicted in another image from a degree of progression of the damage from the time $T_1$ to the time $T_2$, and a cell 20 to which it is predicted that the damage may spread may be specified. Note that the image data according to the embodiment need not necessarily be on the floor slab basis, and in another embodiment, the image data may be a part of a floor slab or over several floor slabs.

As described above, in the embodiment, the control unit 401 predicts a range to which the damage spreads based on the degree of overlap between the damaged portion and the member constituting the construction included in the design data. Furthermore, in the embodiment, the control unit 401 predicts the range to which the damage spreads based on the direction in which the damaged portion extends and the direction in which the member constituting the construction included in the design data extends. As a result, the control unit 401 can specify a cell 20 to which the damage may spread. Therefore, the control unit 401 can appropriately compress the image data while avoiding the region of the cell 20 to which the damage may spread. Therefore, according to the embodiment, the control unit 401 can reduce a data capacity of the image data while reducing a decrease in detection accuracy of an abnormality in a construction.

FIG. 11 is a diagram illustrating an example of the image compression processing according to the embodiment described above. An upper part of FIG. 11 illustrates processing on the related data associated with the image data captured at the time $T_2$. Furthermore, a lower part illustrates the compression processing on the image data at the time $T_1$. Note that the time $T_2$ is a time after the time $T_1$. For example, when an image at the time $T_1$ is to be compressed, the control unit 401 may acquire the related data 11 at the time $T_2$ captured after the time $T_1$. Then, the control unit 401 divides the acquired related data 11 into a plurality of cells 20 ((1) in FIG. 11). For example, the control unit 401 may divide the related data 11 into the cells 20 in a predetermined number such as m×n, and assign, to each of the cells 20 obtained by the division, address information indicating an arrangement in the related data. Furthermore, the control unit 401 acquires the image data 10 to be compressed at the time $T_1$, and divides the acquired image data 10 into a plurality of cells 20 ((2) in FIG. 11). For example, the control unit 401 may divide the image data 10 into the cells 20 in a predetermined number such as m×n, and assign, to each of the cells 20 obtained by the division, address information indicating an arrangement in the image data 10.

Subsequently, the control unit 401 specifies a cell 20 including the damage indicated by the related data at the time $T_2$ (1101 in FIG. 11) among the cells 20 obtained by the division, and sets "False" indicating that the cell is not to be compressed to the specified cell 20. In addition, the control unit 401 specifies, among the cells 20 obtained by the division, a cell 20 to which the damage may spread (1102 in FIG. 11), based on the damage indicated by the related data at the time $T_2$ and the design data stored in the storage unit 402. Then, the control unit 401 sets "False" indicating that the cell is not to be compressed to the specified cell 20. Furthermore, the control unit 401 sets "True" Indicating that the cell is to be compressed to other cells ((3) in FIG. 11).

Then, the control unit 401 compresses, among the cells 20 obtained by dividing the image data 10 captured at the time $T_1$, the image data of the cell 20 which is specified to be compressed from the related data 11 at the time $T_2$ and to which "True" is set ((4) in FIG. 11).

Subsequently, the control unit 401 combines the uncompressed cells 20 at positions set to "False" with the compressed cells 20 at the positions set to "True", and generates the compressed image data 30 corresponding to the original image data ((5) in FIG. 11). Therefore, for example, for the cells 20 including the damage at a point of the time $T_1$ and the region to which it is predicted from the design data that the damage may spread, it is possible to maintain sufficient quality as an image used for inspection work or the like. On the other hand, by compressing data in other regions, it is possible to generate the image data 30 in which the data amount of the image data is reduced. Therefore, it is possible to reduce a data capacity of the image data while reducing a decrease in accuracy of detecting and monitoring an abnormality or the like in a construction.

Further details of the image compression processing according to the embodiment described above will be described below.

FIG. 12 is a diagram illustrating an example of the image data information 1200 according to the embodiment. In the image data information 1200, for example, an entry related to an image showing an inspection region where an abnormality such as damage is to be monitored and detected in a construction to be inspected may be registered. The image may be, for example, an image obtained by capturing the inspection region in the construction by attaching an image capturing device to a drone, or an image obtained by capturing the inspection region using a high-resolution telephoto camera. The entry of the image data information 1200 may include an identification number, position information, time information, and image data, and these pieces of information are associated with one another. The identification number is information for uniquely identifying the image data. The position information is information indicating a position of the inspection region shown in the image data. The time information is information indicating a time at which the image data is captured. The image data is the image data obtained by capturing the inspection region at the position indicated by the position information of the entry, with the image capturing device at the time of the time information. As described above, the image data may be associated with one concrete floor slab, in an example. Furthermore, in another example, the image data may be an image of a part of a floor slab or over several floor slabs. For example, the storage unit 402 of the image processing apparatus 400 may store the image data information 1200.

FIG. 13 is a diagram illustrating the design data information 1300. In the design data information 1300, for example, data related to a design drawing of a construction to be inspected such as a pavement surface of a road, a bridge, or a tunnel is registered. In the design data information 1300, for example, an entry including member identification information and structure information is registered. The member identification information is, for example, identification information for identifying a member such as a reinforcing bar, a steel frame, or concrete used in the construction. The structure information is information indicating, in the construction, a position and an arrangement of a member identified by the member identification information of the entry, and in an example, may be information indicating a contour of a member, such as position coordinates of each vertex of the member in a three-dimensional space and information regarding a side. For example, when the member is a cylindrical reinforcing bar, position coordinates of an end portion of a centerline of the member and information regarding a radius from the centerline may be registered in the structure information. For example, the design data information 1300 as described above may be stored in the storage unit 402 of the image processing apparatus 400.

Figure 14:
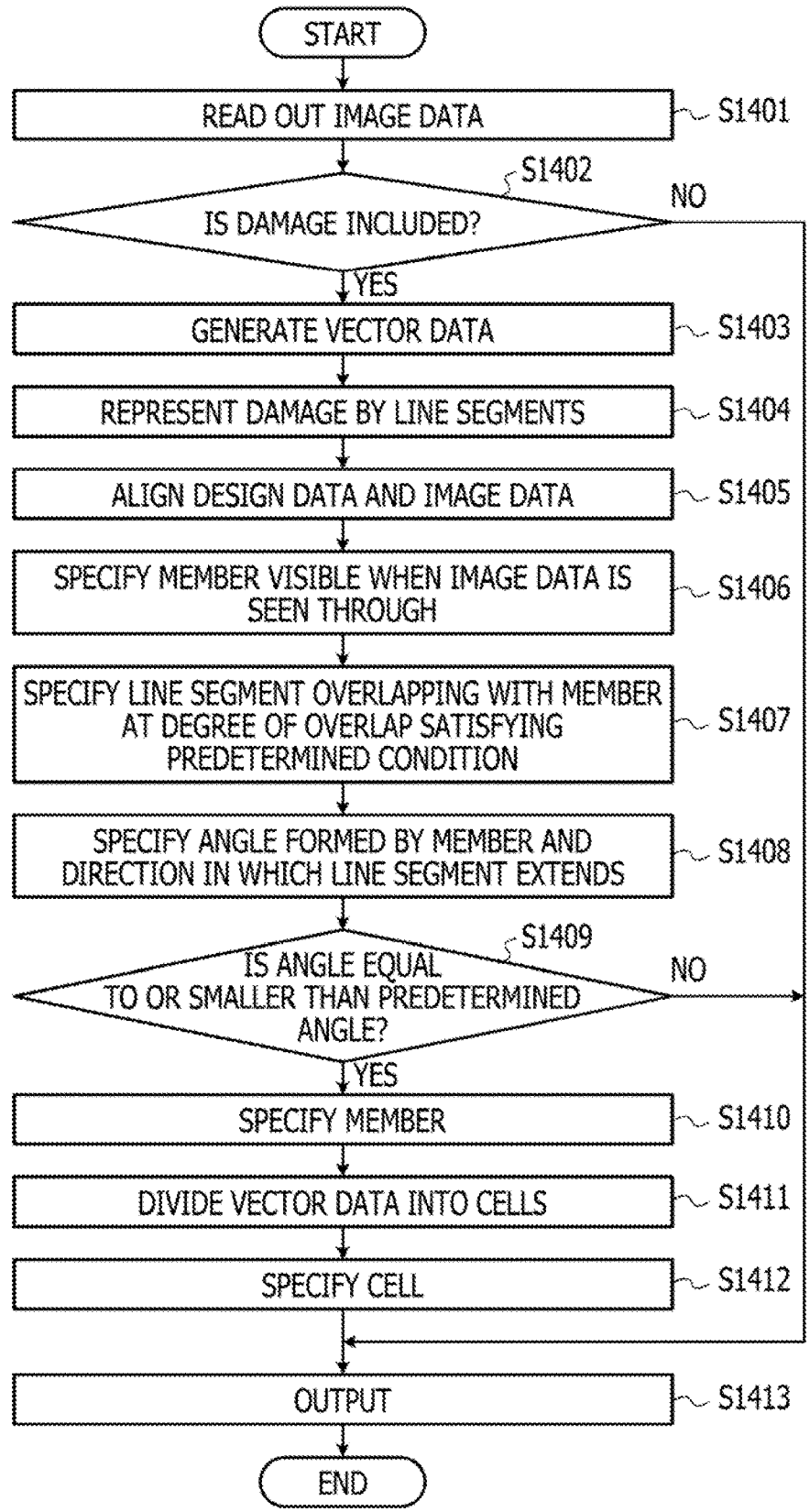
FIG. 14 is a diagram illustrating an operation flow of prediction processing of the damage progression according to the embodiment.

FIG. 14 is a diagram illustrating an operation flow of damage progression prediction processing 9001 according to the embodiment. The control unit 401 may execute the operation flow of FIG. 14, for example, when an instruction for execution of the damage progression prediction processing 9001 is input.

In step 1401 (note that, hereinafter, a step is described as "S", and for example, this step is described as S1401), the control unit 401 reads out image data from the image data information 1200. The control unit 401 may read out, for example, image data captured at the time $T_2$, which is designated by a user as image data to be used for predicting a spread of damage. In S1402, the control unit 401 analyzes the read-out image data, and determines whether a region of a construction shown in the read-out image data includes damage. If the image data includes the damage (Yes in S1402), the flow proceeds to S1403.

In S1403, the control unit 401 specifies a damaged portion by analyzing the image data including the damage, generates vector data representing the shape of the damaged portion, and stores, in the storage unit 402, the vector data in association with the image data. For example, the control unit 401 may generate the damaged portion data 1500 by adding the vector data to an entry including corresponding image data in the image data information 1200.

FIG. 15 is a diagram illustrating the damaged portion data 1500 according to the embodiment. In the damaged portion data 1500, the vector data representing the shape of the damage is added to the entry in which the damage is detected among entries of the image data information 1200. In the damaged portion data 1500, for example, an entry including an identification number, position information, time information, image data, and vector data associated with the image data is registered. The identification number, the position information, the time information, and the image data may be data similar to those described in FIG. 12. The vector data corresponding to the image data may be vector data of the damage detected from data of an image captured by an image capturing device at a time indicated by the time information at a position indicated by the position information of the entry.

Furthermore, in S1404, the control unit 401 represents, by line segments each having a predetermined length, the damage represented by the vector data. The control unit 401 may represent the damage by the line segments, for example, by dividing data of the damage with the line segments from any point on the damage data to a point on the damage data at a position distant by the predetermined length, as described above with reference to FIG. 6.

In S1405, the control unit 401 reads out design data of the construction from the design data information 1300. Then, the control unit 401 models the construction defined by the design data information 1300 into a three-dimensional form, and aligns the image data with the construction. For example, the control unit 401 may align a three-dimensional structure model of the construction with a predetermined point on the image data, and paste the image on the three-dimensional structure model using a texture mapping technology.

In S1406, when the pasted image data is seen through, the control unit 401 specifies a member within a predetermined distance from a member to be inspected having the damage, such as concrete, on the image data. The control unit 401 may specify, for example, a member visible at a depth within a predetermined distance d (cm) from the surface of the member to be inspected, as described above with reference to FIG. 7.

In S1407, the control unit 401 specifies a line segment overlapping with the specified member at a degree of overlap satisfying a predetermined condition. For example, the control unit 401 may specify a line segment within a predetermined distance from the specified member. The control unit 401 may extract, for example, as described with reference to FIG. 8, a combination of a line segment and a member in which a distance between a start point and an end point of the line segment and a centerline of the member is less than a predetermined distance: e (cm) on a plane of the vector data. Note that the predetermined distance: e (cm) may be set to, for example, a distance at which it is estimated that water can deteriorate the member when the water or the like enters from the damage at a position away from the member at this distance.

In S1408, the control unit 401 specifies, for example, an angle formed by the line segment and the member in the extracted combination. For example, the control unit 401 may specify an acute angle among angles formed by the line segment and the centerline of the member on the plane of the vector data. Then, in S1409, control unit 401 determines whether the specified angle is equal to or smaller than a predetermined angle. Note that the predetermined angle may be, for example, less than 90 degrees, and may be, for example, 45 degrees. The predetermined angle may be, for example, set to an angle at which the damage is estimated to spread along the member, if the direction in which the damage extends coincides with the direction in which the member extends within this angle. Note that using the acute angle is exemplary, and the embodiment is not limited to this. In another embodiment, the determination may be performed using an obtuse angle and another threshold.

If the angle specified in S1409 is greater than the predetermined angle (No in S1409), the processing on the line segment ends. On the other hand, if the angle specified in S1409 is equal to or smaller than the predetermined angle (Yes in S1409), the flow proceeds to S1410.

In S1410, the control unit 401 specifies a member whose degree of overlap is a degree of overlap satisfying the predetermined condition in S1407 and which is determined to extend in the same direction as the line segment at an angle equal to or smaller than the predetermined angle in S1409. In S1411, the control unit 401 divides the vector data into cells of a predetermined size. For example, the control unit 401 may divide vector data of a predetermined size into m cells on a horizontal axis, distinguish the cells by a value of m, divide the vector data into n cells on a vertical axis, distinguish the cells by a value of n, and assign address information so that each cell is identified by (m, n).

In S1412, the control unit 401 specifies, among the plurality of cells obtained by dividing the vector data, a cell 20 including the member specified in S1410 when the vector data is seen through. Note that the specified cell 20 is, for example, a cell to which it is predicted that the damage may spread due to deterioration of the construction caused by the damage.

In S1413, the control unit 401 sets "False" indicating that the damage may spread to the cell and the cell is not to be compressed to the cell specified in S1412. Furthermore, the control unit 401 may set "False" also to a cell including the damage. The control unit 401 sets, to other cells, "True" indicating that the damage is less likely to spread to the cell and the cell is to be compressed. Then, the prediction information 1600 in which the setting of "True" or "False" to each cell is registered is output, and the operation flow ends.

FIG. 16 is a diagram illustrating the prediction information 1600 for image data identified by certain identification information according to the embodiment. In the prediction information 1600, an entry is registered in which address information indicating an arrangement of the cell 20 in association with the image data is associated with compression information indicating whether the cell 20 is to be compressed corresponding to the damage and the damage prediction. For example, the control unit 401 may output the above prediction information 1600 in S1413. Therefore, the control unit 401 can output information indicating a range of the cell to which it is predicted that the damage may spread. Note that, in the above-described embodiment, the same value "False" is set to both a cell including the damage and a cell to which the damage may spread, but in another embodiment, the control unit 401 may set different values to the cells. For example, the control unit 401 may output the prediction information 1600 by which a cell predicted to be damaged can be specified.

Furthermore, if no damage is included in the image data in S1402 (No in S1402), the flow proceeds to S1413, the control unit 401 outputs the prediction information 1600, and the operation flow ends. In this case, in the damage prediction in the entries of the prediction information 1600, "True" may be set to all the cells. The output prediction information 1600 may be stored in, for example, the storage unit 402.

As described above, according to the operation flow of FIG. 14, the control unit 401 can predict the range to which the damage spreads based on the design data. Then, the control unit 401 can output the predicted range. For this reason, the control unit 401 can appropriately compress the image data by using information regarding the range to which the damage is predicted to spread, while avoiding the cells to which the damage may spread. Therefore, according to the embodiment, the control unit 401 can reduce a data capacity of the image data while reducing a decrease in detection accuracy of an abnormality in a construction.

Furthermore, in the operation flow of FIG. 14, the control unit 401 predicts the range to which the damage spreads according to the degree of overlap between the damaged portion and the member included in the design data, and thus it is possible to improve prediction accuracy of the range to which the damage spreads. Similarly, in the operation flow of FIG. 14, the control unit 401 predicts the range to which the damage spreads according to the direction in which the damaged portion extends and the direction in which the member included in the design data extends, and thus it is possible to improve the prediction accuracy of the range to which the damage spreads.

Figure 17:
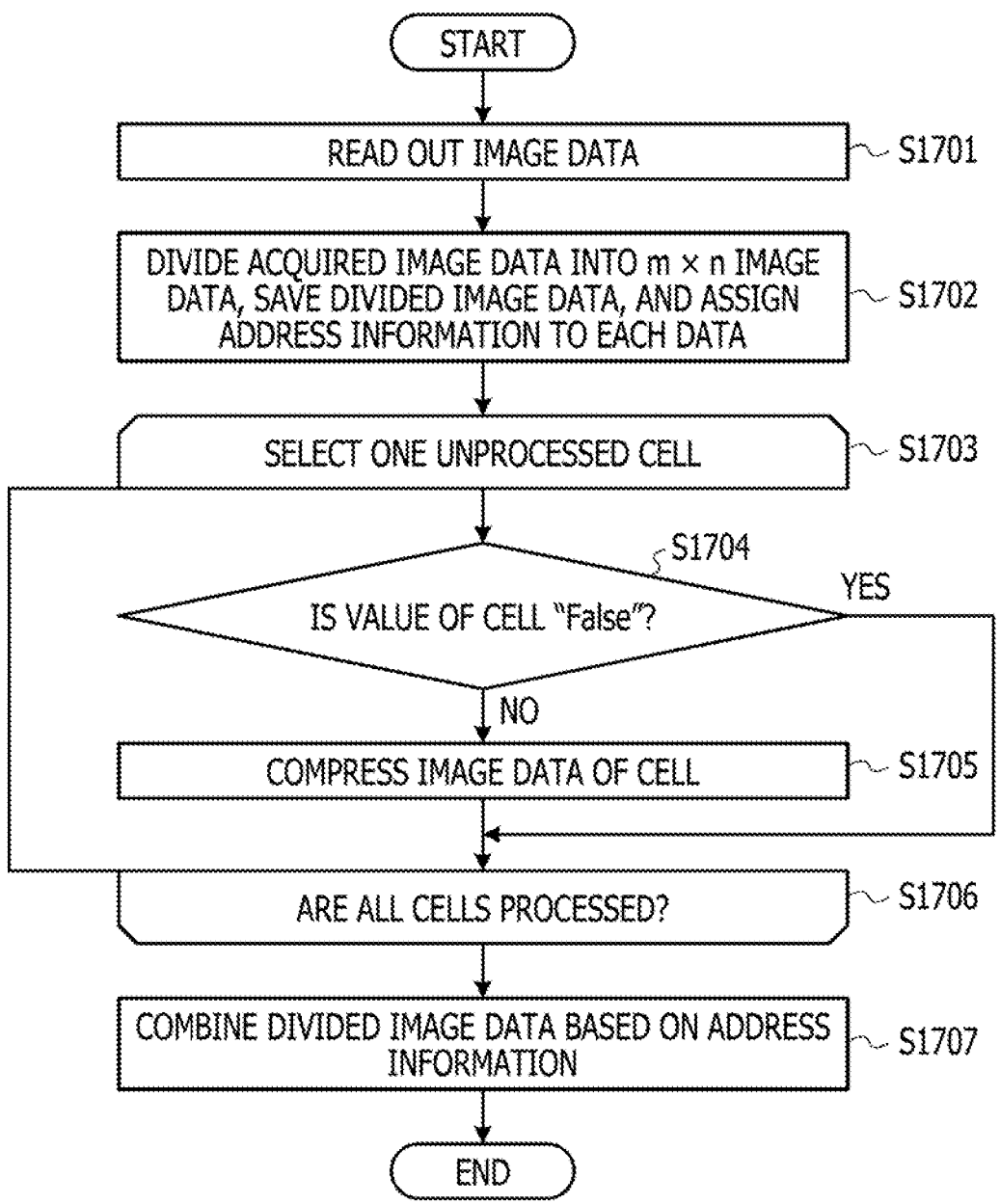
FIG. 17 is a diagram illustrating an operation flow of the image compression processing according to the embodiment.

Subsequently, the image compression processing according to the embodiment will be described. FIG. 17 is a diagram illustrating the operation flow of the image compression processing according to the embodiment. The control unit 401 may start the operation flow of FIG. 17, for example, when an instruction for execution of the image compression processing is input.

In S1701, the control unit 401 reads out image data to be compressed from the image data information 1200. For example, the control unit 401 may read out image data captured at the time $T_1$, which is designated by a user as the image data to be compressed. In S1702, the control unit 401 divides the read-out image data into m×n cell regions, saves the divided image data, and assigns address information to each cell. In an example, the control unit 401 may divide the image data into m cells on the horizontal axis, distinguish the cells by a value of m, divide the image data into n cells on the vertical axis, distinguishes the cells by a value of n, and assign the address information so that each cell is identified by (m, n). Note that the address information assigned to the cells 20 in S1702 may correspond to the address information assigned to the cells of the vector data in S1411 in FIG. 14. In other words, the image data may be divided in the same way as corresponding vector data.

In S1703, the control unit 401 selects one unprocessed cell from the plurality of cells obtained by dividing the image data. In S1704, the control unit 401 determines whether the compression information associated with the address information of the selected cell in the prediction information 1600 is "False" indicating that the cell includes the damage or the damage may spread to the cell. If the compression information of the cell is set to "False" indicating that the cell includes the damage or the damage may spread to the cell (Yes in S1704), the flow proceeds to S1706. On the other hand, if the compression information is set to "True" indicating that the cell includes the damage or there is no possibility that the damage will spread to the cell (No in S1704), the flow proceeds to S1705.

In S1705, the control unit 401 compresses an image of the selected cell. For example, the control unit 401 may reduce the data amount by changing a resolution of the image of the cell whose compression information is set to "True" to be lower. Note that, in another embodiment, a higher compression ratio may be applied to the cell set to "True" than to another cell set to "False" indicating that the cell includes the damage or it is predicted that the damage may spread to the cell. Also in this case, it is possible to reduce the data amount of the image data and efficiently save the image data while reducing the deterioration of the data in the region to which the damage of the image data is likely to spread.

In S1706, the control unit 401 determines whether the processing has been performed on all the cells in the image data. If there is an unprocessed cell, the flow returns to S1703, selects the unprocessed cell, and repeats the processing. On the other hand, if the processing on all the cells has been completed, the flow proceeds to S1707.

In S1707, the control unit 401 combines the plurality of processed cells according to the address information, thereby generating compressed image data corresponding to the original image data, and the operation flow ends.

As described above, according to the embodiment, the control unit 401 predicts the region to which the damage may spread from the damage occurring in the construction and the design data of the construction. Then, the control unit 401 outputs the region to which the damage may spread. For this reason, the control unit 401 can specify, for example, a region in the image data to which the damage is unlikely to spread, and reduce the data size of the image data by compressing the data in this region, for example. Therefore, according to the embodiment, it is possible to reduce the data amount of the image data and efficiently save the image data while reducing the deterioration of the data in the region to which the damage of the image data is likely to spread.

In the above-described embodiment, the control unit 401 operates, for example, as the specification unit 411 in the processing of S1402 in FIG. 14. Furthermore, in the processing of S1412 in FIG. 14, the control unit 401 operates, for example, as the prediction unit 412.

Although the embodiments have been described above as examples, the embodiment is not limited to these embodiments. For example, the above-described operation flow is exemplary, and the embodiment is not limited to this. If possible, the operation flow may be executed by changing the order of processing or may additionally include another processing, or a part of processing may be omitted. For example, the processing of S1411 in FIG. 14 may be executed at a stage before S1411, such as before the processing of S1403.

Figure 18:
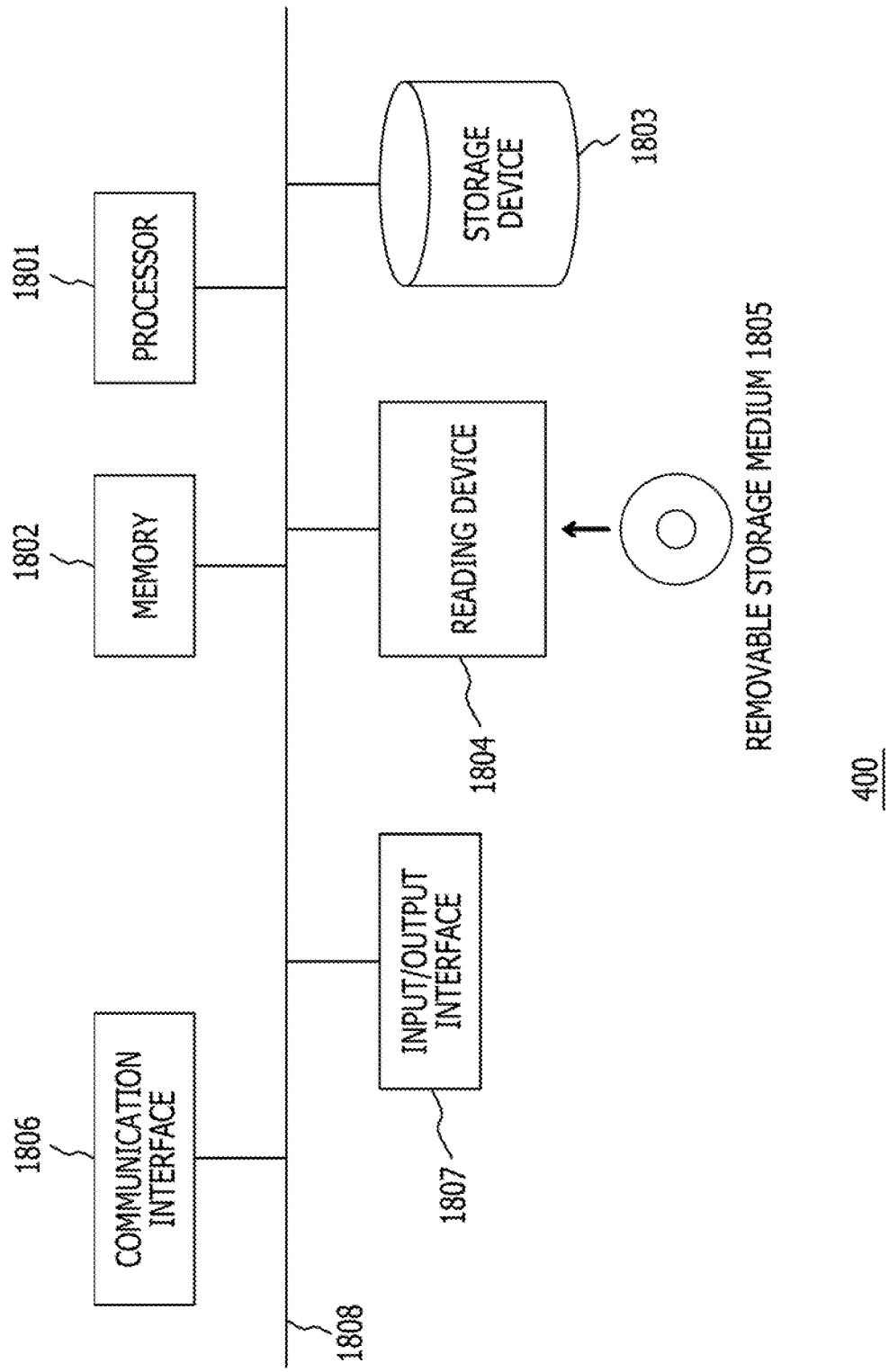
FIG. 18 is a diagram illustrating a hardware configuration of a computer for achieving the image processing apparatus according to the embodiment.

FIG. 18 is a diagram illustrating a hardware configuration of the image processing apparatus 400 for achieving the image processing apparatus 400 according to the embodiment. The hardware configuration for achieving the image processing apparatus 400 in FIG. 18 includes, for example, a processor 1801, a memory 1802, a storage device 1803, a reading device 1804, a communication interface 1806, and an input/output interface 1807. Note that the processor 1801, the memory 1802, the storage device 1803, the reading device 1804, the communication interface 1806, and the input/output interface 1807 are connected to each other via a bus 1808, for example.

The processor 1801 may be, for example, a single processor, a multiprocessor, or a multicore processor. The processor 1801 uses the memory 1802 to execute, for example, a program describing procedures of the above-described operation flow, so that, for example, some or all of the above-described functions of the control unit 401 are provided, such as the specification unit 411 and the prediction unit 412.

The memory 1802 is, for example, a semiconductor memory, and may include a RAM region and a ROM region. The storage device 1803 is, for example, a semiconductor memory such as a hard disk or a flash memory, or an external storage device. Note that RAM is an abbreviation for random access memory. In addition, ROM is an abbreviation for read only memory.

The reading device 1804 accesses a removable storage medium 1805 according to an instruction from the processor 1801. The removable storage medium 1805 is achieved by, for example, a semiconductor device (such as a USB memory), a medium to which information is input and from which information is output by magnetic action (such as a magnetic disk), or a medium to which information is input and from which information is output by optical action (such as CD-ROM or DVD). Note that USB is an abbreviation for universal serial bus. CD is an abbreviation for compact disc. DVD is an abbreviation for digital versatile disk.

The storage unit 402 includes, for example, the memory 1802, the storage device 1803, and the removable storage medium 1805. The storage device 1803 of the image processing apparatus 400 stores, for example, the image data information 1200, the design data information 1300, the damaged portion data 1500, and the prediction information 1600.

The communication interface 1806 transmits and receives data via a network, for example, according to an instruction from the processor 1801. The input/output interface 1807 may be, for example, an interface between an input device and an output device. The input device is, for example, a device such as a keyboard or a mouse that receives an instruction from a user. The output device is, for example, a display device such as a display and an audio device such as a speaker.

Each program according to the embodiment is provided to the image processing apparatus 400 in the following forms, for example.

(1) Installed in the storage device 1803 in advance.
(2) Provided by the removable storage medium 1805.
(3) Provided from a server such as a program server.

Note that the hardware configuration for achieving the image processing apparatus 400 described with reference to FIG. 18 is exemplary, and the embodiment is not limited to this. For example, some or all of the above-described functions may be implemented as hardware including FPGA, SoC, and the like. Note that FPGA is an abbreviation for field programmable gate array. SoC is an abbreviation for system-on-a-chip.

Several embodiments have been described above. However, the embodiments are not limited to the above-described embodiments and it should be understood that the embodiments include various modifications and alternatives of the above-described embodiments. For example, it would be understood that various embodiments can be embodied by modifying components without departing from the spirit and scope of the embodiments. Furthermore, it would be understood that various embodiments may be implemented by appropriately combining a plurality of components disclosed in the above-described embodiments. Moreover, a person skilled in the art would understand that various embodiments can be implemented by deleting or replacing some components from all the components indicated in the embodiments or by adding some components to the components indicated in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium recording an image processing program that causes a computer to execute processing of:
   specifying a damaged portion by analyzing a captured image of a construction; and
   predicting, in the captured image, a range to which damage spreads based on the specified damaged portion and design data associated with the construction,
   wherein the construction is a pavement surface of a road, a bridge or a tunnel,
   wherein the image processing program causes a computer to execute processing of predicting the range to which the damage spreads according to a degree of overlap between the damaged portion and a member constituting the construction included in the design data,
   wherein the member is a material as a reinforcing bar or a steel frame which is susceptible to deterioration or corrosion when exposed to water or wind or rain and whose shape can be changed by the corrosion,
   wherein the degree of overlap is determined by superimposing the captured image with the damaged portion, with members visible at a depth within a predetermined distance from the surface of the concrete when the surface of the concrete including the damage is seen through from the image capturing direction of the input image,
   wherein a combination of a line segment which indicates the damaged portion and the member in which a distance between the line segment and the member is less than a specific distance is extracted based on the degree of overlap, an angle between the line segment and the member of the combination is determined and the range to which the damage spreads is predicted based on the angle and the line segment.

2. The non-transitory computer-readable recording medium according to claim 1, wherein the image processing program causes a computer to execute processing of outputting the predicted range.

3. An image processing method, comprising:
   specifying, by a computer, a damaged portion by analyzing a captured image of a construction; and
   predicting, in the captured image, a range to which damage spreads based on the specified damaged portion and design data associated with the construction,
   wherein the construction is a pavement surface of a road, a bridge or a tunnel,
   wherein the computer executes processing of predicting the range to which the damage spreads according to a degree of overlap between the damaged portion and a member constituting the construction included in the design data,
   wherein the member is a material as a reinforcing bar or a steel frame which is susceptible to deterioration or corrosion when exposed to water or wind or rain and whose shape can be changed by the corrosion,
   wherein the degree of overlap is determined by superimposing the captured image with the damaged portion, with members visible at a depth within a predetermined distance from the surface of the concrete when the surface of the concrete including the damage is seen through from the image capturing direction of the input image,
   wherein a combination of a line segment which indicates the damaged portion and the member in which a distance between the line segment and the member is less than a specific distance is extracted based on the degree of overlap, an angle between the line segment and the member of the combination is determined and the range to which the damage spreads is predicted based on the angle and the line segment.

4. An information processing apparatus comprising:
   a memory; and
   a processor coupled to the memory and configured to:
   specify a damaged portion by analyzing a captured image of a construction; and
   predict, in the captured image, a range to which damage spreads based on the specified damaged portion and design data associated with the construction, wherein the construction is a pavement surface of a road, a bridge or a tunnel, wherein the processor executes processing of predicting the range to which the damage spreads according to a degree of overlap between the damaged portion and a member constituting the construction included in the design data, wherein the member is a material as a reinforcing bar or a steel frame which is susceptible to deterioration or corrosion when exposed to water or wind or rain and whose shape can be changed by the corrosion, wherein the degree of overlap is determined by superimposing the captured image with the damaged portion, with members visible at a depth within a predetermined distance from the surface of the concrete when the surface of the concrete including the damage is seen through from the image capturing direction of the input image, wherein a combination of a line segment which indicates the damaged portion and the member in which a distance between the line segment and the member is less than a specific distance is extracted based on the degree of overlap, an angle between the line segment and the member of the combination is determined and the range to which the damage spreads is predicted based on the angle and the line segment.

* * * * *